United States Patent
Jungmann et al.

(10) Patent No.: US 10,762,953 B2
(45) Date of Patent: Sep. 1, 2020

(54) MEMORY ARRAY WITH REDUCED CIRCUITRY

(71) Applicant: International Business Machines Corporation, Armonk, NY (US)

(72) Inventors: Noam Jungmann, Tel Aviv (IL); Donald W. Plass, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/218,585

(22) Filed: Dec. 13, 2018

(65) Prior Publication Data

US 2020/0194059 A1    Jun. 18, 2020

(51) Int. Cl.
| | |
|---|---|
| *G11C 11/00* | (2006.01) |
| *G11C 11/419* | (2006.01) |
| *G06F 30/30* | (2020.01) |
| *G11C 11/412* | (2006.01) |
| *G11C 11/413* | (2006.01) |
| *H01L 27/11* | (2006.01) |

(52) U.S. Cl.
CPC .......... *G11C 11/419* (2013.01); *G06F 30/30* (2020.01); *G11C 11/412* (2013.01); *G11C 11/413* (2013.01); *H01L 27/11* (2013.01)

(58) Field of Classification Search
CPC ... G11C 11/419; G11C 11/412; G11C 11/413; G06F 30/30; H01L 27/11; H01L 27/1104
See application file for complete search history.

(56) References Cited

U.S. PATENT DOCUMENTS

| | | | | |
|---|---|---|---|---|
| 5,381,363 A | * | 1/1995 | Bazes | ................... G11C 11/413 365/154 |
| 5,561,630 A | | 10/1996 | Katoh et al. | |
| 8,254,194 B2 | | 8/2012 | Giambartino et al. | |
| 8,462,572 B2 | | 6/2013 | Sharma et al. | |
| 8,559,248 B2 | * | 10/2013 | Dally | ....................... G11C 7/12 365/154 |
| 9,047,980 B2 | | 6/2015 | Agarwal et al. | |

(Continued)

FOREIGN PATENT DOCUMENTS

WO    2011087597 A2    7/2011

OTHER PUBLICATIONS

Esmaeili et al., "Dual-Edge Triggered Sense Amplifier Flip-Flop Utilizing an Improved Scheme to Reduce Area, Power, and Complexity", 19th IEEE International Conference on Electronics, Circuits, and Systems (ICECS 2012), 2012, 4 pages.

(Continued)

*Primary Examiner* — Pho M Luu
(74) *Attorney, Agent, or Firm* — Timothy J. Singleton

(57) ABSTRACT

A memory array is described herein that includes a static random-access memory (SRAM) array to store data. The memory array also includes a bit circuit to retrieve the data from the SRAM array, the bit circuit to be operated with a clock signal that oscillates between a low state and an intermediate state, wherein the intermediate state is between the low state and a high state. Furthermore, the memory array includes a sense amplifier to amplify an output signal from the bit circuit indicating a value of the stored data, wherein the sense amplifier does not include a cross coupled positive field-effect transistor.

20 Claims, 7 Drawing Sheets

(56) References Cited

U.S. PATENT DOCUMENTS 9,640,256 B1 * 5/2017 Roy .................. G11C 11/005
9,654,146 B2 * 5/2017 Chen ................. G06F 11/10

OTHER PUBLICATIONS

Jeong et al., "Switching PMOS Sense Amplifier for High-Density Low-Voltage Single-Ended SRAM", IEEE Transactions on Circuits and Systems—I: Regular Papers, vol. 62, No. 6, Jun. 2015, 9 pages.

* cited by examiner

600

MEMORY ARRAY WITH REDUCED CIRCUITRY

BACKGROUND

The present disclosure relates generally to circuits, and more specifically, but not exclusively, to executing computer instructions with memory arrays that have a reduced circuit design.

Computing devices can include any number of different types of memory to store data to be used by a processor to execute read and write instructions. In some current computing devices, memory can include static random-access memory (SRAM) that uses bistable latching circuits or flip-flops to store each bit. SRAM may be used as a cache device in a computing device by storing copies of data from slower non-volatile memory. SRAM cells can store single values and any number of SRAM cells can be organized into various columns and rows. In some memory chips, each column of SRAM cells can be connected to a bit circuit and a sense amplifier. In some current sense amplifier designs, sense amplifier circuits are repeated a large number of times within dense memory circuits and contribute to memory efficiency degradation. Cross coupled PFETs (e.g., p-channel field-effect transistors or p-channel metal-oxide semiconductor field-effect transistors) in current sense amplifier designs support high side noise and voltage difference. These may impact density and efficiency of memory arrays.

SUMMARY

According to an embodiment described herein, a memory array can include a static random-access memory (SRAM) array to store data. The memory array can also include a bit circuit to retrieve the data from the SRAM array, the bit circuit to be operated with a clock signal that oscillates between a low state and an intermediate state, wherein the intermediate state is between the low state and a high state. In some embodiments, the low, intermediate, and high states may be states or voltages, having varying levels or states relative to one another and within a range for a power rail on which a memory array or memory chip is operating. Furthermore, the memory array can include a sense amplifier to amplify an output signal from the bit circuit indicating a value of the stored data, wherein the sense amplifier does not include a cross coupled positive field-effect transistor (PFET).

In some embodiments, a method for manufacturing a memory array can include manufacturing the memory array to include a static random-access memory (SRAM) array to store data. The method can also include manufacturing the memory array to further include a bit circuit to retrieve the data from the SRAM array, the bit circuit to be operated with a clock signal that oscillates between a low state and an intermediate state, wherein the intermediate state is between the low state and a high state. Furthermore, the method can include manufacturing the memory array to further include a sense amplifier to amplify an output signal from the bit circuit indicating a value of the stored data, wherein the sense amplifier does not include a cross coupled positive field-effect transistor (PFET).

In some embodiments, a computer program product for designing a memory chip can include a computer readable storage medium having program instructions embodied therewith, wherein the computer readable storage medium is not a transitory signal per se, the program instructions executable by a processor to cause the processor to design the memory chip comprising a static random-access memory (SRAM) array to store data. The program instructions can also cause the processor to add a bit circuit to the memory chip to retrieve the data from the SRAM array, the bit circuit to be operated with a clock signal that oscillates between a low state and an intermediate state, wherein the intermediate state is between the low state and a high state. Furthermore, the program instructions can cause the processor to add a sense amplifier to the memory chip to amplify an output signal from the bit circuit indicating a value of the stored data, wherein the sense amplifier does not include a cross coupled positive field-effect transistor (PFET).

DETAILED DESCRIPTION

Figure 1:
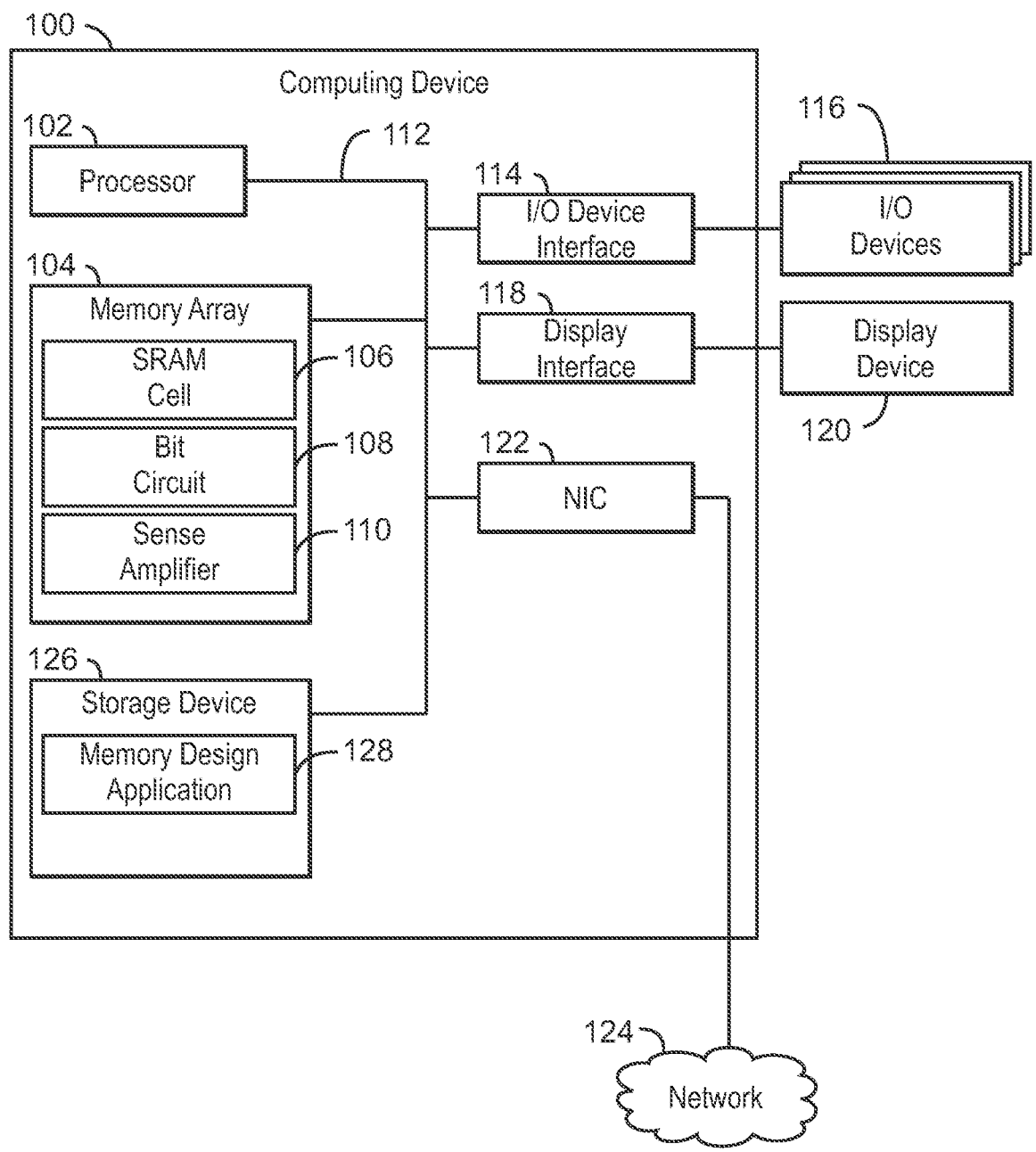
FIG. 1 depicts a block diagram of a computing device with a memory circuit with reduced circuitry according to an embodiment described herein.

Computing devices can include any number of different types of memory to store data to be used by a processor to execute read and write instructions. In some examples, memory in a computing device can include static random-access memory (SRAM) that uses bistable latching circuits or flip-flops to store each bit. In some embodiments, SRAM can be used as a cache device in a computing device by storing copies of data from slower non-volatile memory. In some examples, each SRAM cell can store a single value and any number of SRAM cells can be organized into various columns and rows. Each column of SRAM cells can be connected to a bit circuit and a sense amplifier, which can determine the values stored in the SRAM cells of each column.

In some current sense amplifier designs, sense amplifier circuits are repeated a large number of times within dense memory circuits and contribute to memory efficiency degradation. Cross coupled PFETs (e.g., p-channel field-effect transistors or p-channel metal-oxide semiconductor field-effect transistors) in current sense amplifier designs support high side noise and voltage difference, but impact density and efficiency of memory arrays. The inventive concepts and techniques of the present disclosure reduce circuitry in memory chips. In some embodiments, the present disclosure reduces memory chip circuitry by not including a cross coupled PFETs in the sense amplifier. Cross coupled PFETs may be excluded from one or more of an input side and an output side of the sense amplifier in the present disclosure. For example, some embodiments of the present disclosure exclude cross coupled PFETs from both the input side and the output side of the sense amplifier. In some embodiments of the present disclosure, cross couple support may be provided through bit line cross coupling, bit selective devices isolating bit lines from sense amplifiers, or combinations of the above-referenced bit line configurations. In some embodiments, a cross coupled PFET in a bit line may be supported on a high side, while the sense amplifier remains disconnected from the bit line on a low side. Such configurations may improve sense amplifier performance and power saving. The inventive concepts, techniques, and embodiment configurations described herein may result in reduced area of memory chips and/or memory arrays and reduce overall transistor count in a sense amplifier circuit.

In some embodiments described herein, a memory array can include a static random-access memory (SRAM) array to store data. The SRAM array can include any number of SRAM cells, which each store a single value. The memory array can also include a bit circuit to retrieve the data from the SRAM array. The bit circuit can be operated with a clock signal that oscillates between a low state and an intermediate state, wherein the intermediate state is between the low state and a high state. In some embodiments, memory arrays (SRAM array) or memory chips operate on a specific power rail, having a specified voltage or range of voltages. In such embodiments, a low voltage or low state may be understood as a ground state (e.g., 0 volts). The high state or high voltage may be variable based on a technology, power supply, or application. In some instances, the high voltage or high state may be understood as a full level or voltage, or substantially full level or voltage, at which the circuit or memory array operates (e.g., 1 volt). The intermediate state or voltage may be a voltage, state, or level proximate to a threshold voltage (VT) of a specified transistor (a BS or BSN PFET transistor). For example, if the BS PFET transistor has a threshold voltage of 200 my, and a high state or voltage is 1 volt, the intermediate state, voltage, or level may be at or proximate to 250-300 mv, according to some embodiments. Furthermore, the memory array can include a sense amplifier to amplify an output signal from the bit circuit indicating a value of the stored data, wherein the sense amplifier does not include a cross coupled positive field-effect transistor (PFET). By operating the bit circuit with an intermediate state, the cross coupled PFET in the sense amplifier can be excluded from the memory array.

According to embodiments herein, techniques can reduce the circuitry on a memory chip used to retrieve data to execute read and write operations. For example, the techniques herein can reduce the number of transistors in a sense amplifier circuit coupled to each column of SRAM chips. Specifically, the techniques can remove a cross couple PFET from each of the sense amplifiers, which can increase free space on a memory circuit to include additional SRAM chips, and the like. In some embodiments, bit circuit logic is modified to include additional logic. However, the bit circuit logic can be used across multiple bit circuits so that there is an aggregate increase in available space on a memory chip.

With reference now to FIG. 1, an example computing device is described with a memory circuit with reduced circuitry. The computing device 100 may be for example, a server, desktop computer, laptop computer, tablet computer, or smartphone. In some examples, computing device 100 may be a cloud computing node. Computing device 100 may be described in the general context of computer system executable instructions, such as program modules, being executed by a computer system. Generally, program modules may include routines, programs, objects, components, logic, data structures, and so on that perform particular tasks or implement particular abstract data types. Computing device 100 may be practiced in distributed cloud computing environments where tasks are performed by remote processing devices that are linked through a communications network. In a distributed cloud computing environment, program modules may be located in both local and remote computer system storage media including memory storage devices.

The computing device 100 may include a processor 102 that is adapted to execute stored instructions, a memory array 104 to provide temporary memory space for operations of said instructions during operation. The processor can be a single-core processor, multi-core processor, computing cluster, or any number of other configurations. The memory array 104 can include random access memory (RAM), static random-access memory (SRAM), read only memory, flash memory, or any other suitable memory systems. As described in greater detail below in relation to FIG. 2, the memory array 104 can include an SRAM cell 106, a bit circuit 108, and a sense amplifier 110. In some embodiments, the bit circuit 108 can retrieve data from the SRAM cell 106 in response to a read operation based on a clock signal that oscillates between a low state and an intermediate state, wherein the intermediate state is between the low state and a high state. In some examples, the sense amplifier 110 can amplify an output signal from the bit circuit indicating a value of the stored data without using a cross coupled positive field-effect transistor (PFET).

The processor 102 may be connected through a system interconnect 112 (e.g., PCI®, PCI-Express®, etc.) to an input/output (I/O) device interface 114 adapted to connect the computing device 100 to one or more I/O devices 116. The I/O devices 116 may include, for example, a keyboard and a pointing device, wherein the pointing device may include a touchpad or a touchscreen, among others. The I/O devices 116 may be built-in components of the computing device 100. The I/O devices 116 may also be devices that are externally connected to the computing device 100.

The processor 102 may also be linked through the system interconnect 112 to a display interface 118 adapted to connect the computing device 100 to a display device 120. The display device 120 may include a display screen that is a built-in component of the computing device 100. The display device 120 may also include a computer monitor, television, or projector, among others, that is externally connected to the computing device 100. In addition, a network interface controller (NIC) 122 may be adapted to connect the computing device 100 through the system interconnect to the network 124. In some embodiments, the NIC 122 can transmit data using any suitable interface or protocol, such as the internet small computer system interface, among others. The network 124 may be a cellular network, a radio network, a wide area network (WAN), a local area network (LAN), or the Internet, among others.

The processor 102 may also be linked through the system interconnect 112 to a storage device 126 that can include a hard drive, an optical drive, a universal serial bus (USB) flash drive, an array of drives, or any combinations thereof. In some examples, the storage device 126 may include data used to execute instructions by the processor 102. In some examples, the storage device 126 can include a memory design application 128 that can generate a design for a memory chip, wherein the memory chip includes sense amplifiers without cross coupled PFETs. The memory design application 128 can also design the memory chip so that a bit circuit in the memory chip is operated with a clock signal that oscillates between a low state and an intermediate state. In some embodiments, the intermediate state is between the low state and a high state that represent a binary zero and a binary one. In some embodiments, the memory design application 128 can also add a sense amplifier to the memory chip to amplify an output signal from the bit circuit indicating a value of the stored data, wherein the sense amplifier does not include a cross coupled positive field-effect transistor.

It is to be understood that the block diagram of FIG. 1 is not intended to indicate that the computing device 100 are to include all of the components shown in FIG. 1. Rather, the computing device 100 can include fewer or additional components not illustrated in FIG. 1 (e.g., additional memory components, embedded controllers, modules, additional network interfaces, etc.). In some instances, the computing device 100 may include a subset of the components shown in FIG. 1. Furthermore, any of the functionalities of the memory design application 128 are partially, or entirely, implemented in hardware and/or in the processor 102. For example, the functionality may be implemented with an application specific integrated circuit, logic implemented in an embedded controller, or in logic implemented in the processor 102, among others. In some embodiments, the functionalities of the memory design application 128 can be implemented with logic, wherein the logic, as referred to herein, can include any suitable hardware (e.g., a processor, among others), software (e.g., an application, among others), firmware, or any suitable combination of hardware, software, and firmware.

Figure 2:
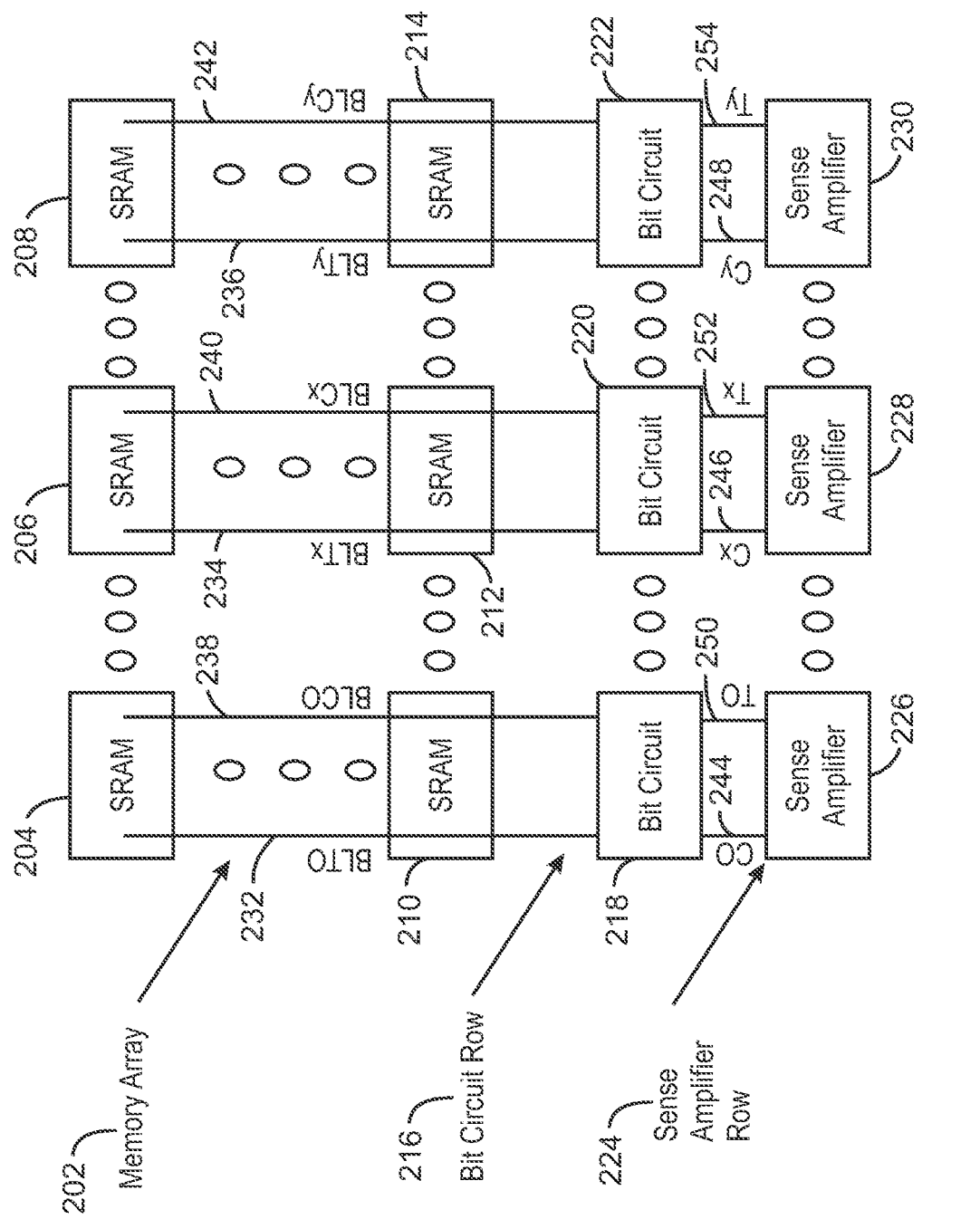
FIG. 2 is a block diagram of an example memory chip with reduced circuitry.

FIG. 2 is a block diagram of an example memory chip with reduced circuitry. In some embodiments, the memory chip 200 can include a memory array 202 that can include any number of SRAM cells 204, 206, 208, 210, 212, and 214. The memory chip 200 can also include a bit circuit row 216 that can include bit circuits 218, 220, and 222. The memory chip 200 can also include a sense amplifier row 224 that can include sense amplifiers 226, 228, and 230.

In some examples, each SRAM cell 204, 206, 208, 210, 212, and 214 can store a single binary value such as a zero value or a one value. The bit circuits 218, 220, and 222 can retrieve the binary values stored in each of the SRAM cells 204, 206, 208, 210, 212, and 214 in response to a read operation or write binary values to the SRAM cells 204, 206, 208, 210, 212, and 214 in response to a write operation. A signal from the SRAM cells 204, 206, 208, 210, 212, and 214 can be transmitted to the bit circuits 218, 220, and 222 along the bit line true 232, 234, and 236, and bit line complement 238, 240, and 242. The bit circuits 218, 220, and 222 can transmit output signals to the sense amplifier 226, 228, and 230 indicating a small differential between the bit line true 232, 234, and 236, and bit line complement 238, 240, and 242. The sense amplifier 226, 228, and 230 can amplify the output signal from the bit circuits 218, 220, and 222 along the c node signal 244, 246, and 248 and the t node signal 250, 252, and 254 to detect the binary values stored in the SRAM cells 204, 206, 208, 210, 212, and 214.

It is to be understood that the block diagram of FIG. 2 is not intended to indicate that the memory chip 200 is to include all of the components shown in FIG. 2. Rather, the memory chip 200 can include fewer or additional components not illustrated in FIG. 2 (e.g., additional memory components, SRAM cells, etc.). For example, the memory chip 200 may include all of the components of FIG. 2, a subset of components of FIG. 2, or additional components not explicitly shown in FIG. 2.

Figure 3:
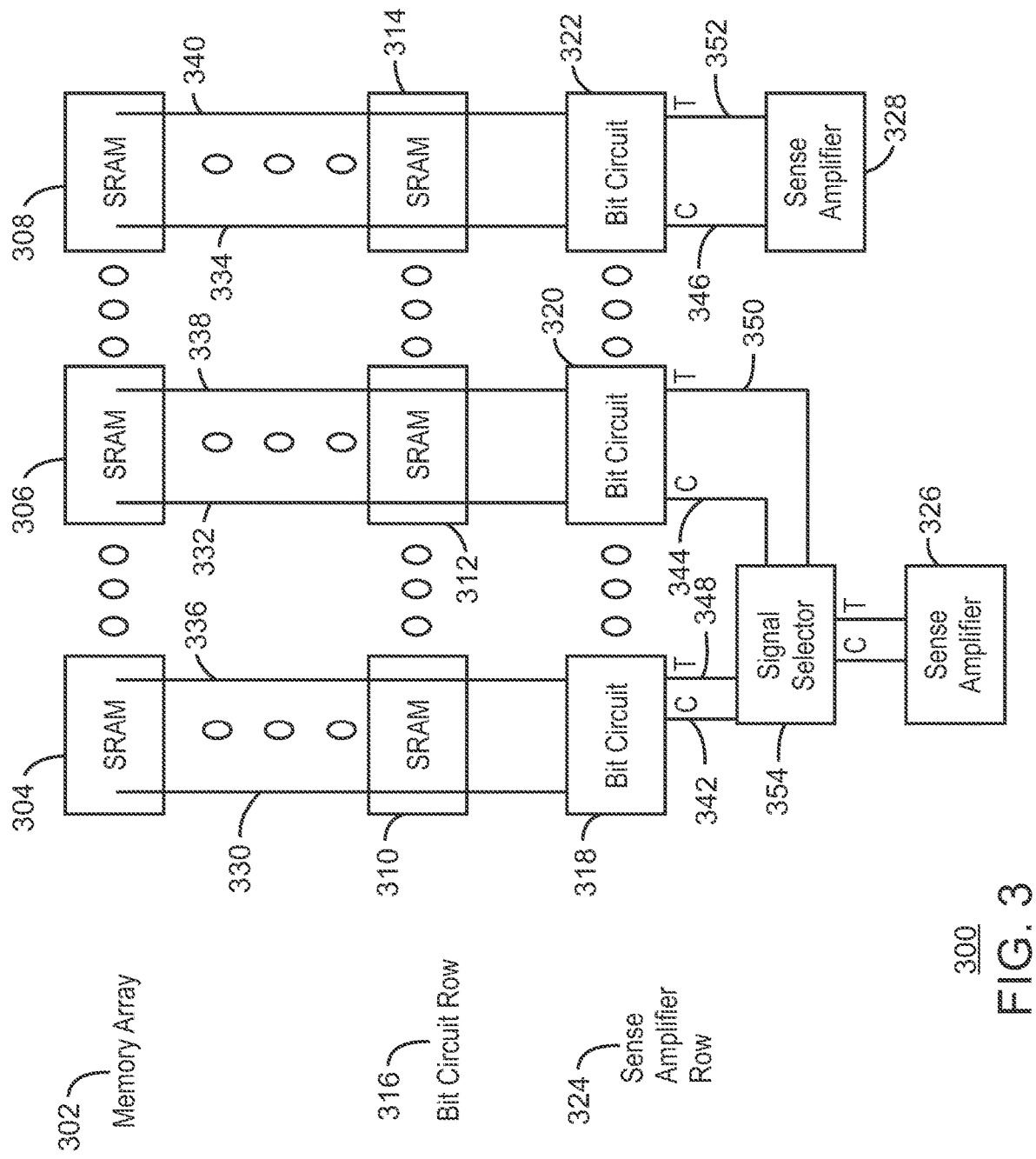
FIG. 3 is an example block diagram of a memory chip in which multiple bit circuits share a sense amplifier.

FIG. 3 is an example block diagram of a memory chip in which multiple bit circuits share a sense amplifier. In some embodiments, the memory chip 300 can include a memory array 302 that can include any number of SRAM cells 304, 306, 308, 310, 312, and 314. The memory chip 300 can also include a bit circuit row 316 that can include bit circuits 318, 320, and 322. The memory chip 300 can also include a sense amplifier row 324 that can include sense amplifiers 326 and 328.

In some examples, each SRAM cell 304, 306, 308, 310, 312, and 314 can store a single binary value such as a zero value or a one value. The bit circuits 318, 320, and 322 can retrieve the binary values stored in each of the SRAM cells 304, 306, 308, 310, 312, and 314 in response to a read operation or write binary values to the SRAM cells 304, 306, 308, 310, 312, and 314 in response to a write operation. A signal from the SRAM cells 304, 306, 308, 310, 312, and 314 can be transmitted to the bit circuits 318, 320, and 322 along the bit line true 330, 332, and 334, and bit line complement 336, 338, and 340. The bit circuits 318, 320, and 322 can transmit output signals to the sense amplifier 326 and 328 indicating a small differential between the bit line true 330, 332, and 334, and bit line complement 336, 338, and 340. The sense amplifier 326 and 328 can amplify the output signal from the bit circuits 318, 320, and 322 along the c node signal 342, 344, and 346 and the t node signal 348, 350, and 352 to detect the binary values stored in the SRAM cells 304, 306, 308, 310, 312, and 314.

In some embodiments, a signal selector 354 can select the c node signal 342 or 344 to be transmitted to sense amplifier 326. Accordingly, sense amplifier 326 can provide output signals for bit circuits 318 and 320. In some embodiments, the sense amplifier 326 can provide output signals for any number of additional bit circuits. For example, the sense amplifier 326 may provide output signals for bit circuits 318, 320, and 322 and the sense amplifier 328 may be removed from the memory chip 300 or a memory circuit.

It is to be understood that the block diagram of FIG. 3 is not intended to indicate that the memory chip 300 is to include all of the components shown in FIG. 3. Rather, the memory chip 300 can include fewer or additional components not illustrated in FIG. 3 (e.g., additional memory components, SRAM cells, etc.). For example, the memory chip 300 may include all of the components of FIG. 3, a subset of components of FIG. 3, or additional components not explicitly shown in FIG. 3. In some embodiments, the memory chip 300 may not include the signal selector 354. In this example, the bit circuits 318 and 320 can directly select the output signal to transmit to the sense amplifier 326. For example, the c node signal 342 can be connected to the c node signal 344 and the t node signal 348 can be connected to the t node signal 350.

Figure 4:
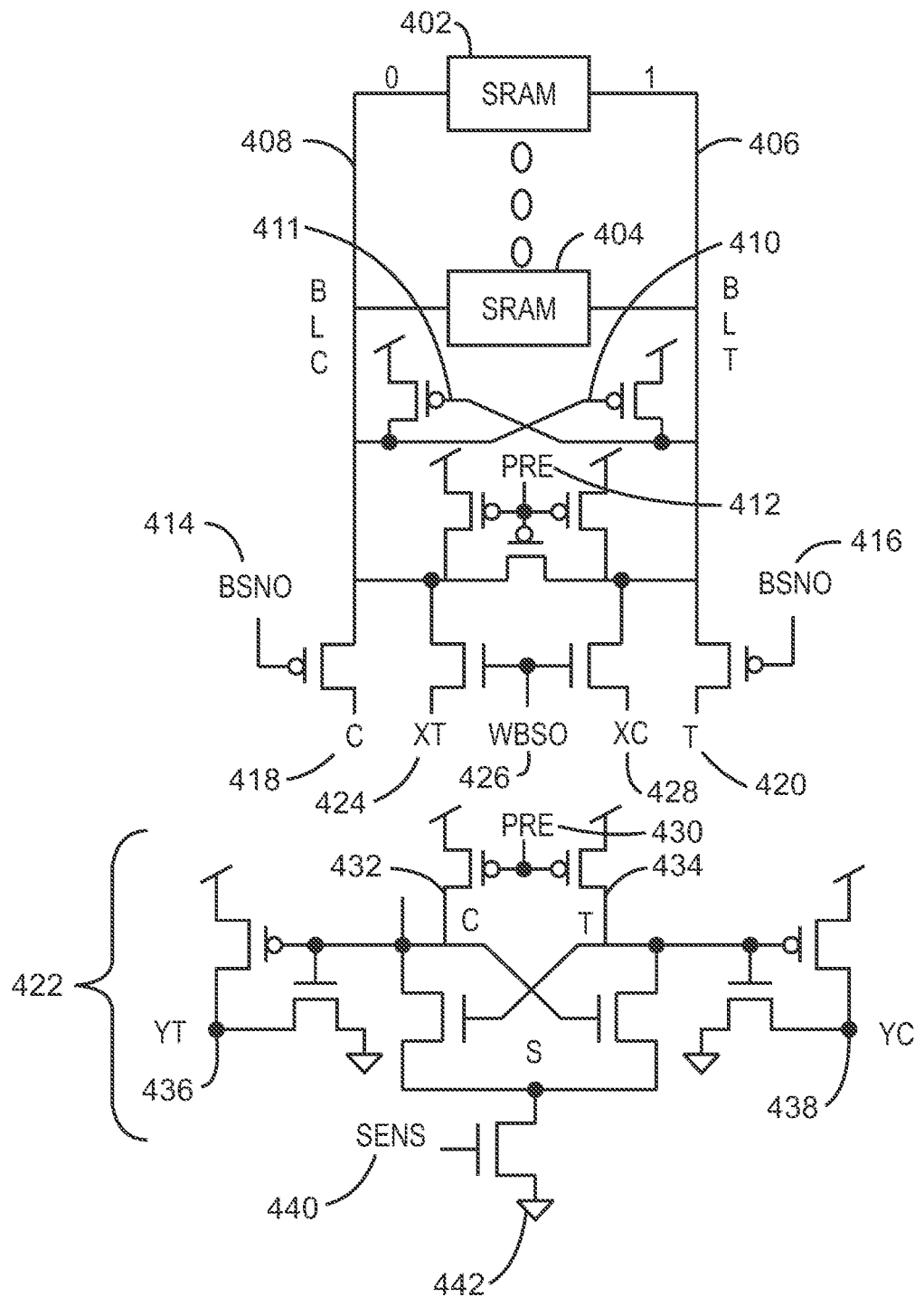
FIG. 4 is an example block diagram of a memory chip with reduced circuitry.

FIG. 4 is an example block diagram of a memory chip with reduced circuitry. In some embodiments, the memory chip 400 can include a column of SRAM cells that include SRAM cell 402 and SRAM cell 404. The SRAM cells 402 and 404 can be connected to a bit line true 406 and a bit line complement 408. The bit line true 406 and the bit line complement 408 can transmit complementary signals and the differential value can indicate the binary value stored in SRAM cell 402 and SRAM cell 404. In some examples, the memory chip 400 can include a cross coupled PFET 410 and 411 that can be used to maintain a differential value between the bit line true 406 and bit line complement 408. The memory chip 400 can also include a pre-charge terminal 412 connected to the bit line true 406 and bit line complement 408. Furthermore, the memory chip 400 can include BSN0 transistors 414 and 416 that connect to the bit line complement 408 and the bit line true 406, respectively. In some embodiments, BSN transistors may be Bit Switch Not (BSN) transistors which control signal to select which bit line may connect to a sense amplifier for a read or other operation. In some instances, a BSN transistor may operate as or similar to a multiplexer. A result of the BSN0 transistors 416 and 414 and the bit line true 406 and bit line complement 408 can be the C node signal 418 and T node signal 420 that are transmitted to the sense amplifier 422. For example, as shown in FIG. 4, the C node signal 418 can be transmitted to the sense amplifier 422 based on connection of the BSN0 transistor 414 to the bit line complement 408. The T node signal 420 can be transmitted to the sense amplifier 422 based on connection of the BSN0 transistor 416 to the bit line true 406. The XT node 424, WBSO node 426, and XC node 428 can be used in the memory chip to write values to the SRAM cells 402 and 404. In some instances, a WBSO node may be understood as a Write Bit Switch (WBS) node. In embodiments where the BSN transistor connects to a sense amplifier for a read operation, a WBSO node may connect to a sense amplifier for a write operation.

In some embodiments, the sense amplifier 422 can include a pre-charge terminal 430 that can be connected to C node 432 and T node 434 of the sense amplifier 422. In some embodiments, the SRAM cell is symmetric, having nodes for True (T node 434) and Complement (C node 432) data bits. The sense amplifier 422 can generate an output signal by the YT node 436 or YC node 438 respective of the C/T node 432 or 434 pulled down by sense signal 440. In some embodiments, a ground terminal 442 is also included in the sense amplifier 422.

In some embodiments, the sense amplifier 422, which does not include a cross coupled PFET, can be used to execute a read operation from the SRAM cells 402 and 404. For example, the memory chip 400, or a memory array on the memory chip 400, can transmit a high voltage signal to the pre-charge terminal 412 and the pre-charge terminal 430. The memory chip 400, or a memory array on the memory chip 400, can also execute a word line select to open a word line stored in SRAM cells 402 and 404. Accordingly, a bit stored in SRAM cells 402 or 404 can be transmitted via bit line true 406 or bit line complement 408. In some examples, the memory chip 400, or a memory array on the memory chip 400, can open the BSN0 transistors 414 and 416 to pull down the voltage of the C node signal 418. The memory chip 400 can also raise a sense signal 440 to a high voltage to indicate that the sense amplifier 422 can provide the output signal by the YT node 436 or YC node 438 respective of the C or T node 432 or 434 pulled down by sense signal 440 indicating the value stored in the SRAM cells 402 and 406. The memory chip 400, or a memory array on the memory chip 400, can also close or disconnect the BSN0 transistors 414 and 416 to an intermediate level. The BSN0 transistors 414 and 416 can be closed to an intermediate state representing a voltage between a low state and a high state as described below in relation to FIG. 5.

In some embodiments, the XT node 424 in the memory chip or memory cell corresponds to the T node 434 of the sense amplifier 422. Similarly, in some embodiments, the XC node 428 in the memory chip or memory cell corresponds to the C node 432 of the sense amplifier 422. In some instances, the sense amplifier 422 drives a next level of bit line hierarchy (e.g., a Global bit line). In such instances, the YC node 438 of the sense amplifier 422 may correspond to the T node 434 on the next level of bit line hierarchy, while the YT node 436 corresponds to the C node 432 of the sense amplifier 422 on the next level of bit line hierarchy.

It is to be understood that the block diagram of FIG. 4 is not intended to indicate that the memory chip 400 is to include all of the components shown in FIG. 4. Rather, the memory chip 400 can include fewer or additional components not illustrated in FIG. 4 (e.g., additional memory components, SRAM cells, etc.). For example, the memory chip 200 may include all of the components of FIG. 4, a subset of components of FIG. 4, or additional components not explicitly shown in FIG. 4. By way of further example, in some embodiments the sense amplifier 422 may not include the C node 432 and T node 434 PFETs inside the sense amplifier 422. In this embodiment, the pre-charge terminals 412, or other pre-charge devices, of the bit line can be used to pre-charge the bit line and the C node 432 and T node 434 of the sense amplifier 422 in preparation for the next operation.

Figure 5:
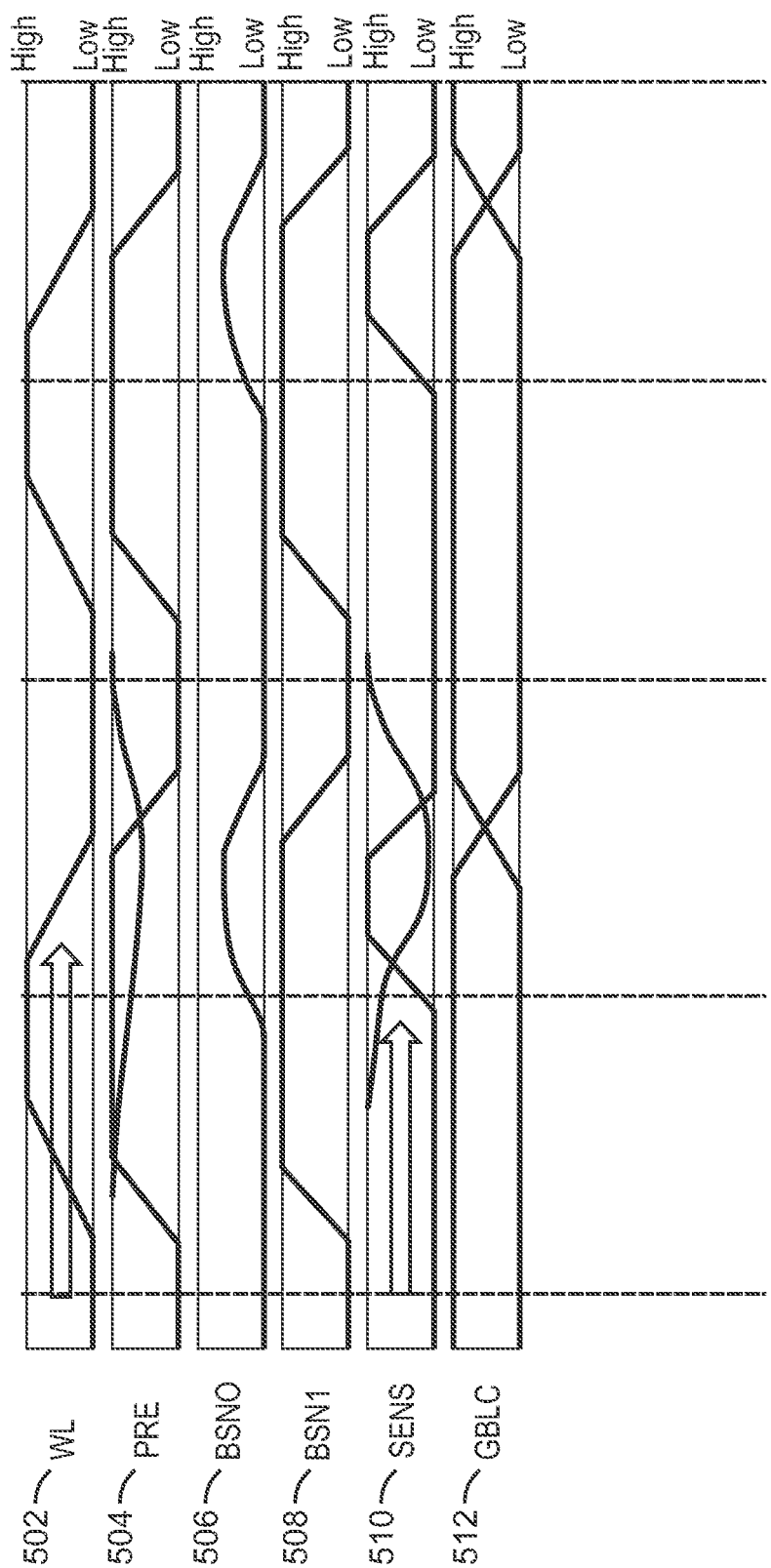
FIG. 5 is an example timing diagram of signals that operate the memory chip with reduced circuitry.

FIG. 5 is an example timing diagram of signals that operate the memory chip with reduced circuitry. In some embodiments, a word line signal 502 can indicate that binary values are to be retrieved from one or more SRAM cells. In some examples, a pre-charge signal 504 can indicate that a high signal is to be transmitted to the pre-charge terminals of the memory chip. In some embodiments, a BSN0 signal 506 can alternate between a low state and an intermediate state to establish a differential value between a bit line true and bit line complement, which indicates a value retrieved from an SRAM cell. In some examples, a BSN1 signal 508 can alternate between a low state and a high state to enable retrieving a data value from an SRAM cell. In some examples, a sense signal 510 (e.g., a sense signal from a sense amplifier (SENS)) can indicate when to retrieve a value from a sense amplifier indicating a value of the SRAM cell. In some embodiments, a global bit line complement (GLBC) signal 512 can indicate a complementary bit line value for any number of memory arrays.

In some embodiments, the pre-charge signal 504 transitions to a high state and the BSN1 508 transitions to a high voltage state in response to initiating a read operation from an SRAM cell. The word line signal 502 can then transition to a high voltage state and the BSN0 signal 506 can transition to an intermediate voltage state. In some examples, the sense signal 510 can then transition to a high voltage state to result in an output signal indicating the binary value of an SRAM cell access for the read operation. The word line signal 502, pre-charge signal 504, BSN0 signal 506, BSN1 signal 508, and sense signal 510 can then return to a low voltage state as the GLBC signal 512 indicates new data is to be latched or retrieved.

The timing diagram 500 illustrates an example of a read operation based on a set of signals. However, the read operation can include fewer or additional signals. Furthermore, write operations can also be performed using the set of signals.

Figure 6:
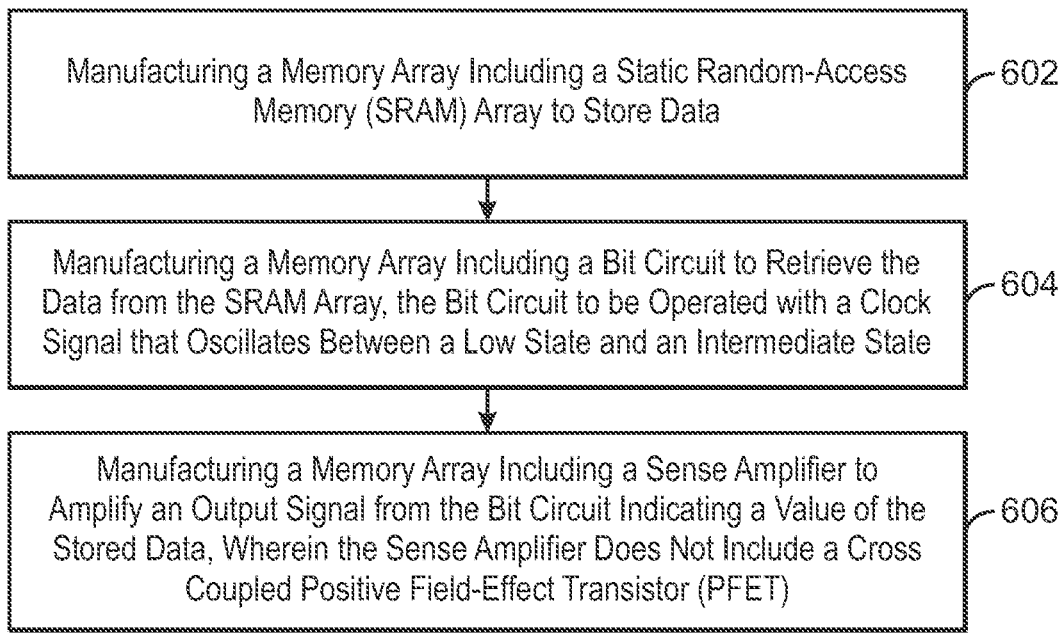
FIG. 6 is a process flow diagram of an example method that can manufacture a memory circuit with reduced circuitry according to an embodiment described herein.

FIG. 6 is a process flow diagram of an example method that can manufacture a memory circuit with reduced circuitry. The method 600 can be implemented with any suitable computing device, such as the computing device 100 of FIG. 1. In some embodiments, the method 600 can be implemented with a node in a supercomputer, a server providing a remote service, a desktop computer device, or a mobile device, among others.

At block 602, a memory array can be manufactured to include a static random-access memory (SRAM) array to store data. As discussed above, the SRAM array can include any number of rows and columns of SRAM cells that can store binary values. In some examples, each column of SRAM cells in an SRAM array can be connected to a bit line true and a bit line complement. A difference in voltages between the bit line true and bit line complement can indicate the binary value retrieved from an SRAM cell during the execution of a read operation.

At block 604, the memory array can be manufactured to also include a bit circuit to retrieve the data from the SRAM array. In some examples, each column of SRAM cells can include a separate bit circuit. The bit circuit can be operated with a clock signal that oscillates between a low state and an intermediate state, wherein the intermediate state is between the low state and a high state. The intermediate state is described above in relation to FIG. 5.

In some embodiments, the bit circuit can retrieve the data from SRAM cells in an SRAM array in response to a read operation. The read operation can include transmitting a word line select signal to the SRAM array, setting the clock signal in the bit circuit to a low signal, and transmitting a high input signal (e.g., a high voltage) to the sense amplifier following a predetermined period of time to produce a signal difference, and setting the clock signal to the bit circuit to an intermediate state. In some examples, the high input signal pulls down a sense amplifier node within the sense amplifier. In some embodiments, the output signal from the bit circuit to the sense amplifier is a difference between the bit line complement and a bit line true of the SRAM array. In some embodiments, the PFETs or BSN0 transistors 414 and 416 of FIG. 4 are initiated in a low state and transition to the intermediate state as a high signal is transmitted to the sense amplifier. In some examples, the bit circuit comprises a cross coupled PFET connected to a bit line complement and a bit line true. The cross coupled PFET in the bit circuit can maintain a voltage differential between the bit line true and bit line complement.

In some embodiments, a PFET transistor in a bit circuit can be closed in response to detecting that a low-level bit line is transferred into a sense amplifier node, which can pull down the voltage of the sense amplifier node. Closing the PFET transistor of the bit circuit can prevent the sense amplifier from detecting a load of the bit line. Additionally, closing the PFET transistor can save power since the bit line capacitance is not fully discharged. Accordingly, when the BSN0 transistors both transition to a high voltage, the PFETs are closed on the high bit line and the low bit line side. The BSN0 transitions to a high voltage along with a sense signal transitioning to a high voltage. This allows disconnecting the bit line true and bit line complementary from the sense amplifier nodes. This is done for reducing the total capacitance the sense signal detects when the sense signal transitions to a high voltage and saving power by not discharging the bit line side that is delivering the low voltage into the sense amplifier. In some embodiments, there are extra cross coupled PFETs inside the sense amplifier to process internal noise and the BSN0 transistors can be fully closed. In some examples, there are no extra cross coupled PFETs inside the sense amplifier and the BSN0 transistors can be partially off in an intermediate state.

Moreover, in some embodiments, an opposing side of the PFET transistor in the bit circuit can be maintained in an open state. In some embodiments, both BSN0 PFETs 414 and 416 have the same control. Accordingly, the BSN0 PFETs 414 and 416 are either both ON or OFF or in the same intermediate voltage level. When the bit line drops low, the BSN0 intermediate level keeps the PFET OFF and on the side of the bit line that stays high, the intermediate BSN0 level keeps the PFET partially ON. The opposing side of the PFET transistor can include a side of the bit circuit with the bit line that did not discharge from the SRAM array. By maintaining the opposing side of the PFET transistor in the bit circuit in an intermediate open state, noise can be processed without affecting the voltage differential. For example, the partially open bit circuit PFET transistor can pull a sense amplifier node voltage higher through the corresponding connected cross coupled PFET on the bit line of the bit circuit. Accordingly, in some embodiments, noise being propagated cannot pull the sense amplifier node to a low voltage. As a result, the sense amplifier node can remain at a high voltage.

In other words, the techniques herein include cross coupled PFETs on the bit line side and transitioning the BSN0 transistors to an intermediate level when a sense signal in the sense amplifier transitions to a high state or voltage. On the bit line side that is going down in voltage, the BSN0 intermediate voltage level closes the PFET as the voltage approaches zero. For example, the BSN0 gate can increase voltage and the bit line side can be pulled down to a particular voltage. On the bit line side that is to stay high, the BSN0 intermediate state or voltage can maintain the PFET in an open state as the bit line is high (full supply) and the BSN0 is at (supply-vt) so the PFET is on the verge of conducting. In some example, the voltage differential is zero because both the bit line and the sense amplifier nodes are high. In some embodiments, if noise drops the sense amplifier node down, the voltage differential increases and the cross coupled PFET on the high bit line side would start to supply current through the BSN0 on this side to increase the voltage of the sense amplifier node.

At block 606, the memory array can be manufactured to also include a sense amplifier to amplify an output signal from the bit circuit indicating a value of the stored data, wherein the sense amplifier does not include a cross coupled positive field-effect transistor. In some examples, the sense amplifier can amplify the voltage differential from the bit circuit and output a signal indicating the binary value stored in an SRAM cell. In some embodiments, the memory array includes a separate SRAM array or column of SRAM cells providing a second output signal to the sense amplifier and a signal selector to select the first output signal or the second output signal. For example, the signal selector can determine whether the voltage differential from a first bit circuit or a second bit circuit is to be provided to a sense amplifier and the sense amplifier can output a signal corresponding to the first bit circuit or the second bit circuit. In some embodiments, any number of bit circuits can transmit a voltage differential to a single sense amplifier from any number of c node signals and a t node signals, as discussed above in relation to FIG. 4. Accordingly, the signal selector can further reduce the circuitry in a memory array by reducing a number of sense amplifiers that process the c node and t node signals for bit circuits.

The process flow diagram of FIG. 6 is not intended to indicate that the operations of the method 600 are to be executed in any particular order, or that all of the operations of the method 600 are to be included in every case. For example, in some embodiments, a subset of the operations in FIG. 6 may be included in method 600. By way of further example, in some instances, the operations shown in FIG. 6 may be included along with additional operations or sub-operations in the method 600.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (erasable programmable read-only memory (EPROM) or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical functions. In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 7:
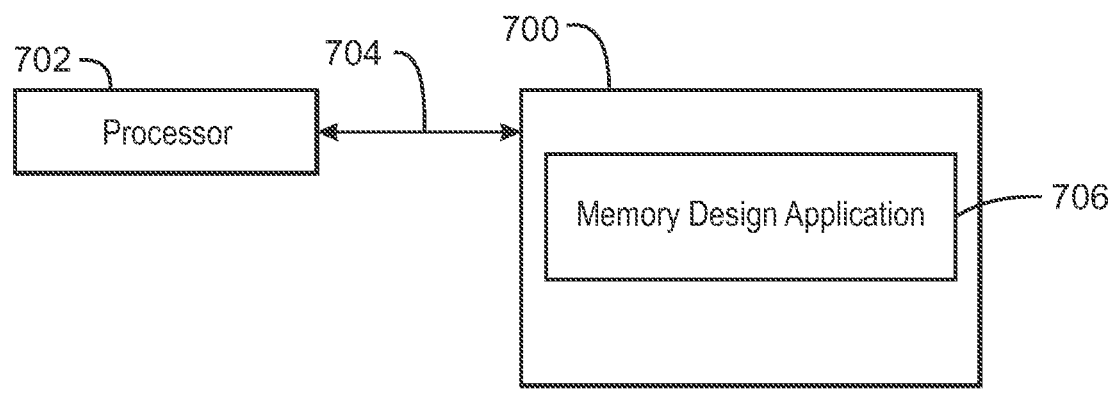
FIG. 7 is a tangible, non-transitory computer-readable medium that can design a memory circuit with reduced circuitry according to an embodiment described herein.

Referring now to FIG. 7, a block diagram is depicted of an example of a tangible, non-transitory computer-readable medium that can design a memory chip with reduced circuitry. The tangible, non-transitory, computer-readable medium 700 may be accessed by a processor 702 over a computer interconnect 704.

Furthermore, the tangible, non-transitory, computer-readable medium 700 may include code to direct the processor 702 to perform the operations of the current method. For example, a memory design application 706 can design a memory chip that includes a static random-access memory (SRAM) array to store data. The memory design application 706 can also add a bit circuit to the memory chip to retrieve the data from the SRAM array, the bit circuit to be operated with a clock signal that oscillates between a low state and an intermediate state, wherein the intermediate state is between the low state and a high state. Furthermore, the memory design application 706 can add a sense amplifier to the memory chip to amplify an output signal from the bit circuit indicating a value of the stored data, wherein the sense amplifier does not include a cross coupled positive field-effect transistor (PFET).

It is to be understood that any number of additional software components not shown in FIG. 7 may be included within the tangible, non-transitory, computer-readable medium 700, depending on the specific application. Furthermore, fewer software components than those shown in FIG. 7 can be included in the tangible, non-transitory, computer-readable medium 700.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A memory array comprising:
    a static random-access memory (SRAM) array to store data;
    a bit circuit to retrieve the data from the SRAM array, the bit circuit is coupled to a plurality of bit lines to be operated with a clock signal that oscillates between a low state and an intermediate state, wherein the intermediate state is between the low state and a high state; and
    a sense amplifier to amplify an output signal from the bit circuit indicating a value of the stored data, wherein the sense amplifier does not include a cross coupled positive field-effect transistor (PFET).

2. The memory array of claim 1, wherein the bit circuit is to retrieve the data in response to a read operation comprising transmitting a word line select signal to the SRAM array, setting the clock signal in the bit circuit to a low signal, transmitting a high input signal to the sense amplifier following a predetermined period of time to produce a signal difference, and setting the clock signal to the bit circuit to the intermediate state.

3. The memory array of claim 2, wherein the high input signal pulls down a sense amplifier node within the sense amplifier.

4. The memory array of claim 3, wherein the output signal from the bit circuit to the sense amplifier is a difference between a bit line complement and a bit line true of the SRAM array.

5. The memory array of claim 3, wherein the PFET is initiated in a low state and transitions to the intermediate state as a high signal is transmitted to the sense amplifier.

6. The memory array of claim 1, wherein the bit circuit comprises a cross coupled PFET connected to a bit line complement and a bit line true.

7. The memory array of claim 1, wherein the output signal is a first output signal, the memory array further comprising a separate SRAM array providing a second output signal to the sense amplifier and a signal selector to select the first output signal or the second output signal.

8. A method for manufacturing a memory array comprising:
    manufacturing the memory array to include a static random-access memory (SRAM) array to store data;
    manufacturing the memory array to further include a bit circuit to retrieve the data from the SRAM array, the bit circuit is coupled to a plurality of bit lines to be operated with a clock signal that oscillates between a low state and an intermediate state, wherein the intermediate state is between the low state and a high state; and
    manufacturing the memory array to further include a sense amplifier to amplify an output signal from the bit circuit indicating a value of the stored data, wherein the sense amplifier does not include a cross coupled positive field-effect transistor (PFET).

9. The method of claim 8, wherein the bit circuit is to retrieve the data in response to a read operation comprising transmitting a word line select signal to the SRAM array, setting the clock signal in the bit circuit to a low signal, and transmitting a high input signal to the sense amplifier following a predetermined period of time to produce a signal difference, and setting the clock signal to the bit circuit to the intermediate state.

10. The method of claim 9, wherein the high input signal pulls down a sense amplifier node within the sense amplifier.

11. The method of claim 10, wherein the output signal from the bit circuit to the sense amplifier is a difference between a bit line complement and a bit line true of the SRAM array.

12. The method of claim 10, wherein the PFET is initiated in a low state and transitions to the intermediate state as a high signal is transmitted to the sense amplifier.

13. The method of claim 8, wherein the bit circuit comprises a cross coupled PFET connected to a bit line complement and a bit line true.

14. The method of claim 8, wherein the output signal is a first output signal, the method further comprising manufacturing the memory array to include a separate SRAM array providing a second output signal to the sense amplifier and a signal selector to select the first output signal or the second output signal.

15. A computer program product for designing a memory chip, the computer program product comprising a computer readable storage medium having program instructions embodied therewith, wherein the computer readable storage medium is not a transitory signal per se, the program instructions being executable by a processor to cause the processor to:
    design the memory chip comprising a static random-access memory (SRAM) array to store data;
    add a bit circuit to the memory chip to retrieve the data from the SRAM array, the bit circuit is coupled to a plurality of bit lines to be operated with a clock signal that oscillates between a low state and an intermediate state, wherein the intermediate state is between the low state and a high state; and
    add a sense amplifier to the memory chip to amplify an output signal from the bit circuit indicating a value of the stored data, wherein the sense amplifier does not include a cross coupled positive field-effect transistor (PFET).

16. The computer program product of claim 15, wherein the bit circuit is to retrieve the data in response to a read operation comprising transmitting a word line select signal to the SRAM array, setting the clock signal in the bit circuit to a low signal, and transmitting a high input signal to the sense amplifier following a predetermined period of time to produce a signal difference, and setting the clock signal to the bit circuit to the intermediate state.

17. The computer program product of claim 16, wherein the high input signal pulls down a sense amplifier node within the sense amplifier.

18. The computer program product of claim 17, wherein the output signal from the bit circuit to the sense amplifier is a difference between a bit line complement and a bit line true of the SRAM array.

19. The computer program product of claim 17, wherein the PFET is initiated in a low state and transitions to the intermediate state as a high signal is transmitted to the sense amplifier.

20. The computer program product of claim 15, wherein the bit circuit comprises a cross coupled PFET connected to a bit line complement and a bit line true.

* * * * *